US006063298A

United States Patent [19]

Wilkie et al.

[11] Patent Number: 6,063,298

[45] Date of Patent: May 16, 2000

[54] FILTERING CENTRIFUGE WITH CAKE HEEL REMOVAL MECHANISM AND ASSOCIATED METHOD

[75] Inventors: William John Wilkie, Escondido; James F. Kleyn, Santee, both of Calif.

[73] Assignee: Baker Hughes Incorporated, Houston, Tex.

[21] Appl. No.: 09/112,676

[22] Filed: Jul. 9, 1998

[51] Int. Cl.[7] .................... B01D 24/46

[52] U.S. Cl. .................... 210/791; 210/787; 210/370; 210/391

[58] Field of Search .................... 210/391, 392, 210/402, 403, 407, 784, 791, 796, 384, 370, 787

[56] References Cited

U.S. PATENT DOCUMENTS

| | | | |
|---|---|---|---|
| 3,608,721 | 9/1971 | Lopker . | |
| 3,703,983 | 11/1972 | Tholl | 210/86 |
| 3,983,036 | 9/1976 | Lauzeral et al. | 210/391 |
| 4,008,158 | 2/1977 | Davis . | |
| 4,017,399 | 4/1977 | Lopker . | |
| 4,081,381 | 3/1978 | Rosenmund et al. . | |
| 4,113,000 | 9/1978 | Poisson | 55/385.1 |
| 4,131,548 | 12/1978 | Peterson . | |
| 4,142,971 | 3/1979 | Le Fur et al. . | |
| 4,153,550 | 5/1979 | Lautrette . | |
| 4,377,479 | 3/1983 | Pierson . | |
| 4,377,480 | 3/1983 | Pierson . | |
| 4,707,260 | 11/1987 | Nagayama et al. . | |
| 5,202,034 | 4/1993 | Martel, Jr. . | |
| 5,618,424 | 4/1997 | Nagaoka . | |
| 5,622,625 | 4/1997 | Nagaoka . | |

*Primary Examiner*—Jill Warden
*Attorney, Agent, or Firm*—R. Neil Sudol; Henry D. Coleman

[57] ABSTRACT

A filtering centrifuge includes a case, a perforated filter basket disposed for rotation in the case, filter media disposed along an inner surface of the filter basket, and a cake removal mechanism at least partially disposed in the case outside of the filter basket and engageable with the filter media to distort the filter media and induce separation of deposited cake from the filter media. The cake removal mechanism specifically includes an ejector element movably mounted to the case for shifting between a use position adjacent to the filter basket and a neutral position spaced from the filter basket.

28 Claims, 3 Drawing Sheets

FILTERING CENTRIFUGE WITH CAKE HEEL REMOVAL MECHANISM AND ASSOCIATED METHOD

BACKGROUND OF THE INVENTION

This invention relates to a filtering centrifuge. More specifically, this invention relates to a filtering centrifuge with a mechanism for removing cake from filter media disposed along the inner surface of a rotatable filter basket. This invention also relates to an associated method for cleaning a filtering type centrifuge of cake deposited along filter media in the centrifuge.

A filtering centrifuge generally comprises a rotating perforated drum commonly referred to as a basket. This basket is lined with pervious filter media. During operation of the centrifuge, the basket is rotated while a slurry of solids suspended in a liquid is introduced into the basket. The rotation of the basket generates a multiplied centrifugal force which flings the slurry outwardly onto the filter media. The solids portion of the slurry is captured by the filter media and is deposited as a cake layer thereon, while the liquid portion of the slurry drains through the filter media and out of the basket through the perforations therein.

Once the processing of the captured solids is complete, in many cases the solids are automatically discharged by introducing a deflector blade or plow into the captured solids (filter cake) as the basket slowly rotates. The cake is thereby deflected out through an opening in the bottom of the basket, In executing this operation, the plow is stopped short of contacting the filter media to prevent damage thereto. This procedure results in a thin layer of undischarged cake being left in the basket. This undischarged layer of cake is referred to as "heel."

SUMMARY OF THE INVENTION

The present invention is directed to providing a structure and a process for removing heel from the basket of a filtering centrifuge without damaging the filter media. The present invention is intended to provide a simple and inexpensive structure for achieving this end. A process or method for cleaning a filtering centrifuge in accordance with the present invention has an aim of being quick and reliable, as well as preservative of the filter media.

A centrifuge in accordance with the present invention comprises a case, a perforated filter basket disposed for rotation in the case, filter media disposed along an inner surface of the filter basket and a cake removal mechanism at least partially disposed in the case outside of the filter basket and engageable with the filter media to distort the filter media and induce separation of deposited cake from the filter media. The cake removal mechanism specifically includes an ejector element movably mounted to the case for shifting between a use position adjacent to the filter basket and a neutral position spaced from the filter basket.

Where the filter basket has a plurality of perforations, the cake removal mechanism further includes, in accordance with a particular embodiment of the present invention, an elongate strap disposed between the filter media and the filter basket along an inner surface of the filter basket. The strap overlies at least one of the perforations, while the ejector element in the use position cooperates with the strap to distort the filter media and thereby disengage cake from the filter media. More specifically, the strap is provided with at least one pin traversing the one perforation, with the ejector element engaging the pin during a cleaning operation to push the strap and concomitantly the filter media. Even more specifically, the ejector element has a camming surface facing the filter basket, the camming surface engaging the pin to push the strap and concomitantly the filter media.

The strap may take the form of a circumferentially extending endless band. In that case, the band is provided with a plurality of pins traversing respective perforations in the basket; the rejector element engages the pins successively while the filter basket is rotated. Alternatively, the strap may be one of a plurality of axially extending straps with pins traversing perforations in the basket and engageable by the ejector element during rotation of the basket in a cleaning operation.

In accordance with another embodiment of the present invention, the cake removal mechanism incorporates a nozzle assembly having a base element fixed to an inner surface of the case. The nozzle assembly also has an ejector element movably mounted to the base element for shifting between a use position adjacent to the filter basket and a neutral position spaced from the filter basket. Where the base element is provided with a bore, the ejector element is slidably disposed in the bore. The ejector element may be provided with a flange disposed in the bore, the flange serving in part as a pressure surface for shifting the ejector element in a radially inward direction upon the application of pressurized fluid to the flange. The pressurized fluid, e.g., gas, is delivered to the nozzle assembly also with the purpose of generating a jet of gas which emanates from the nozzle against the filter basket.

Therefore, a centrifuge in accordance with a particular embodiment of the present invention comprises a case, a perforated filter basket disposed for rotation in the case, filter media disposed along an inner surface of the filter basket, an elongate flexible cake removal strap disposed between the filter media and the basket along an inner surface of the filter basket, and an actuator mechanism disposed in the case outside of the filter basket in cooperative relationship with the strap for shifting the strap. The actuator mechanism preferably includes an ejector element movably mounted to the case for shifting between a use position adjacent to the filter basket and a neutral position spaced from the filter basket. Where the filter basket has a plurality of perforations and the strap overlies at least one of the perforations, the ejector element in the use position cooperates with the strap to distort the filter media and thereby disengage cake from the filter media. The strap is provided with at least one pin traversing the one of the perforations, the ejector element engaging the pin to push the strap and concomitantly the filter media.

A method for cleaning a filtering centrifuge comprises, in accordance with the present invention, rotating a perforated filter basket in a case, a filter media being disposed along an inner surface of the filter basket, exerting a radial force against the filter media through perforations in the filter basket during the rotation of the basket in the case, and, by virtue of the force exerted on the filter media through the perforations, distorting the filter media to induce separation of deposited cake from the filter media.

Pursuant to a particular feature of the present invention, the exerting of the distortion-inducing force includes pressing, in a radially inward direction, pins extending though the perforations. The pressing of the pins may include shifting an ejector element in the case inwardly towards the filter basket. The ejector element engages the radially outer ends of the pins during a slow rotation of the filter basket, then pushes the pins inwardly. Where the pins are connected to an elongate flexible strap disposed between the filter basket and the filter media, the strap is distorted by the force exerted on the pins, thereby effectuating the distorting of the filter media.

An ejector element may be shifted radially inwardly in response to the feeding of pressurized fluid to the ejector element. In this case, the force exerted on the filter media is the result of ejecting a fluid medium, in a radially inward direction, through the perforations in the filter basket.

A centrifuge in accordance with the present invention comprises a case, a perforated filter basket disposed for rotation in the case, filter media disposed along an inner surface of he filter basket, and a nozzle assembly having a base element fixed to an inner surface of the case, the nozzle assembly including an ejector element movably mounted to the base element for shifting between a use position adjacent to the filter basket and a neutral position spaced from the filter basket.

The base element is preferably provided with a bore, the ejector element being slidably disposed in the bore. The ejector element is provided with a flange disposed in the bore. A source of pressurized gas is operatively connected to the nozzle assembly for directing a jet of gas through the nozzle against the filter basket.

DESCRIPTION OF THE PREFERRED EMBODIMENTS

Figure 1:
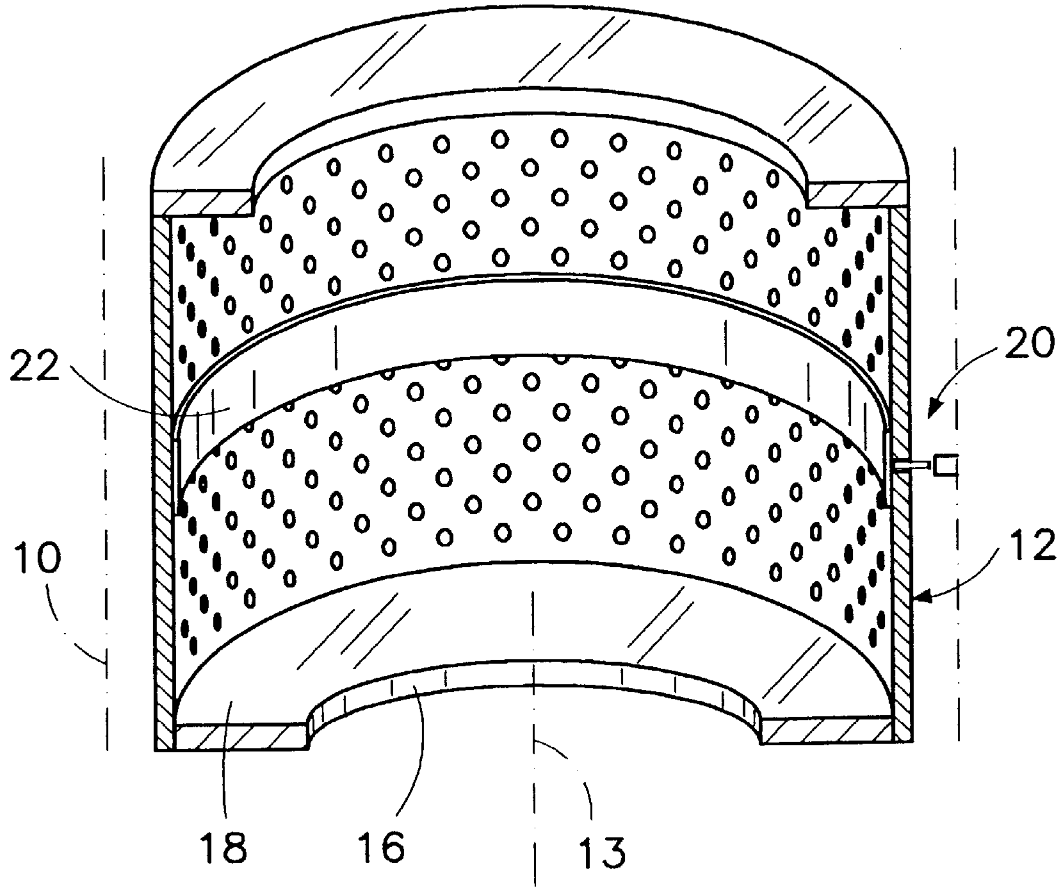
FIG. 1 is a schematic longitudinal cross-sectional view of a filtering centrifuge basket provided with a circumferentially extending flexible strap in accordance with the present invention.

As illustrated in FIG. 1, a filtering centrifuge comprises a tank or case 10 and a perforated cylindrical filter basket 12 disposed in case 10 for rotation about an axis 13. As shown in the detail views of FIGS. 2 and 3, filter media 14, typically a woven fabric, is disposed along an inner surface of filter basket 12. Pursuant to the prior art, in a first step of removing captured solids (filter cake) deposited on filter media 14, a deflector blade or plow (not shown) is inserted into filter basket 12 as the basket slowly rotates. The deflector blade or plow separates a layer of cake from the total cake deposited on filter media 14. The separated cake drops out through an opening 16 in a bottom panel 18 of basket 12. In executing this operation, the leading edge of the plow is spaced from filter media 14 to prevent damage thereto.

As illustrated in FIGS. 1–4, an ancillary cake removal mechanism 20 is at least partially disposed in case 10 outside of filter basket 12 for removing residual cake or heel left on filter media 14 after the use of the deflector blade or plow to separate an innermost layer of cake from the filter media. Cake removal mechanism 20 includes a circumferentially extending strap or band 22 which is disposed along the inner surface of filter basket 12. Strap 22 carries a plurality of outwardly extending pins 24 which traverse respective perforations or bores 26 formed in a cylindrical side wall 28 of basket 12.

Figure 2:
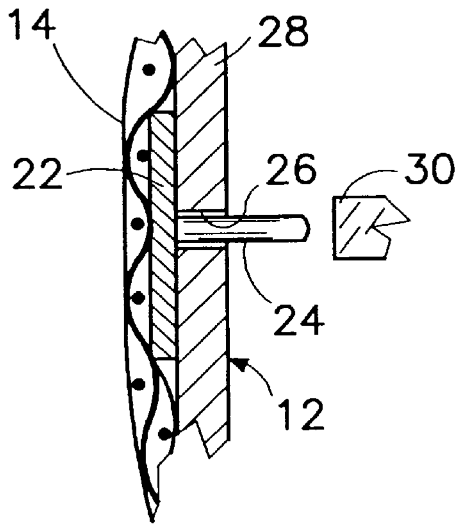
FIG. 2 is a schematic partial cross-sectional view, on an enlarged scale, of a portion of the basket of FIG. 1, showing the strap.
Figure 3:
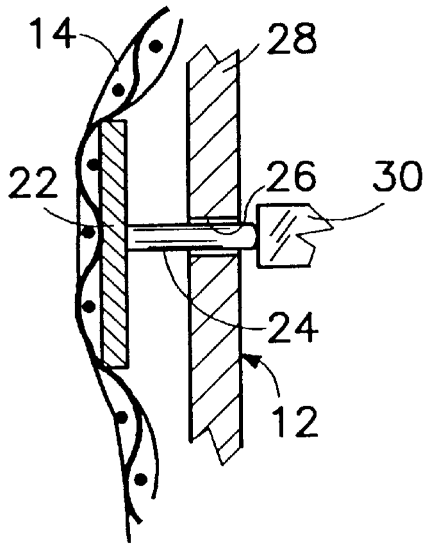
FIG. 3 is a schematic partial cross-sectional view, similar to FIG. 2, showing action of a retractable pawl on the strap.

Cake removal mechanism 20 further includes an ejector element 30 which is movably mounted to case 10 for shifting from a neutral or non-operative position illustrated in FIGS. 1 and 2 to a use or operative position illustrated in FIG. 3. The neutral or non-operative position is assumed by ejector element 30 during filtering operations, while the use or operative position is assumed during a cleaning operation. As filter basket 12 rotates slowly during a heel removal operation, ejector element 30 contacts one pin 24 after another to distort strap 22 in a simulated wave motion (see reference designation 36 in FIG. 4), concomitantly distorting filter media 14 and inducing separation of deposited cake from filter media 14. Thus, cake removal mechanism 20 particularly including strap 22 is engageable with filter media 14 to temporarily deform the filter media for purposes of cake removal.

It is to be noted that circumferentially extending strap 22 is one of a multiplicity of different strap configurations and combinations utilizable for generating a temporary deformation in filter media 14. For example, strap 22 might be replaced by a plurality of circumferentially spaced, axially extending straps (not illustrated). Each such strap might be provided with a single pin projecting radially outwardly through a respective perforation 26 in basket 12, the pins being disposed in a common transverse plane for engagement by ejector element 30 during a heel removal procedure.

Ejector element 30 is radially shiftable by any means, many of which are well known in the art. For example, the shifting of ejector element 30 may be implemented hydraulically, pneumatically, electromagnetically or simply mechanically by a manual operation.

Figure 4:
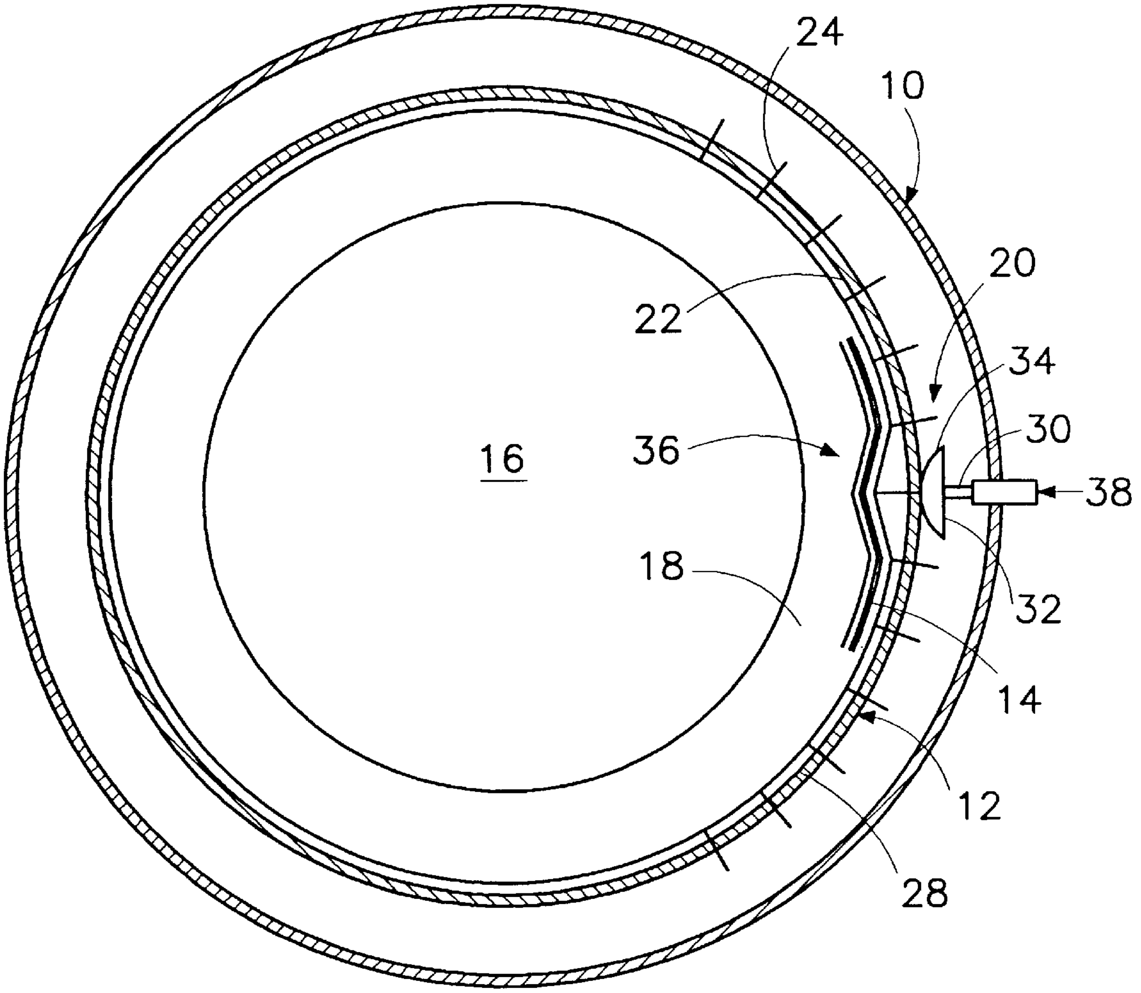
FIG. 4 is a schematic top plan view of the filtering basket of FIG. 1, depicting distortion of a filter media web in accordance with the present invention.

As illustrated in FIG. 4, ejector element 30 may take the form of a plunger provided at a free or inner end with a head 32 having a camming surface 34 facing filter basket 12. Camming surface 34 engages pins 24 to push strap 22 and concomitantly filter media 14 in a radially inward direction during a heel removal procedure or basket cleaning operation. Ejector element or plunger 30 is shiftably mounted to a base 38 in turn fastened to case 10.

Figure 5:
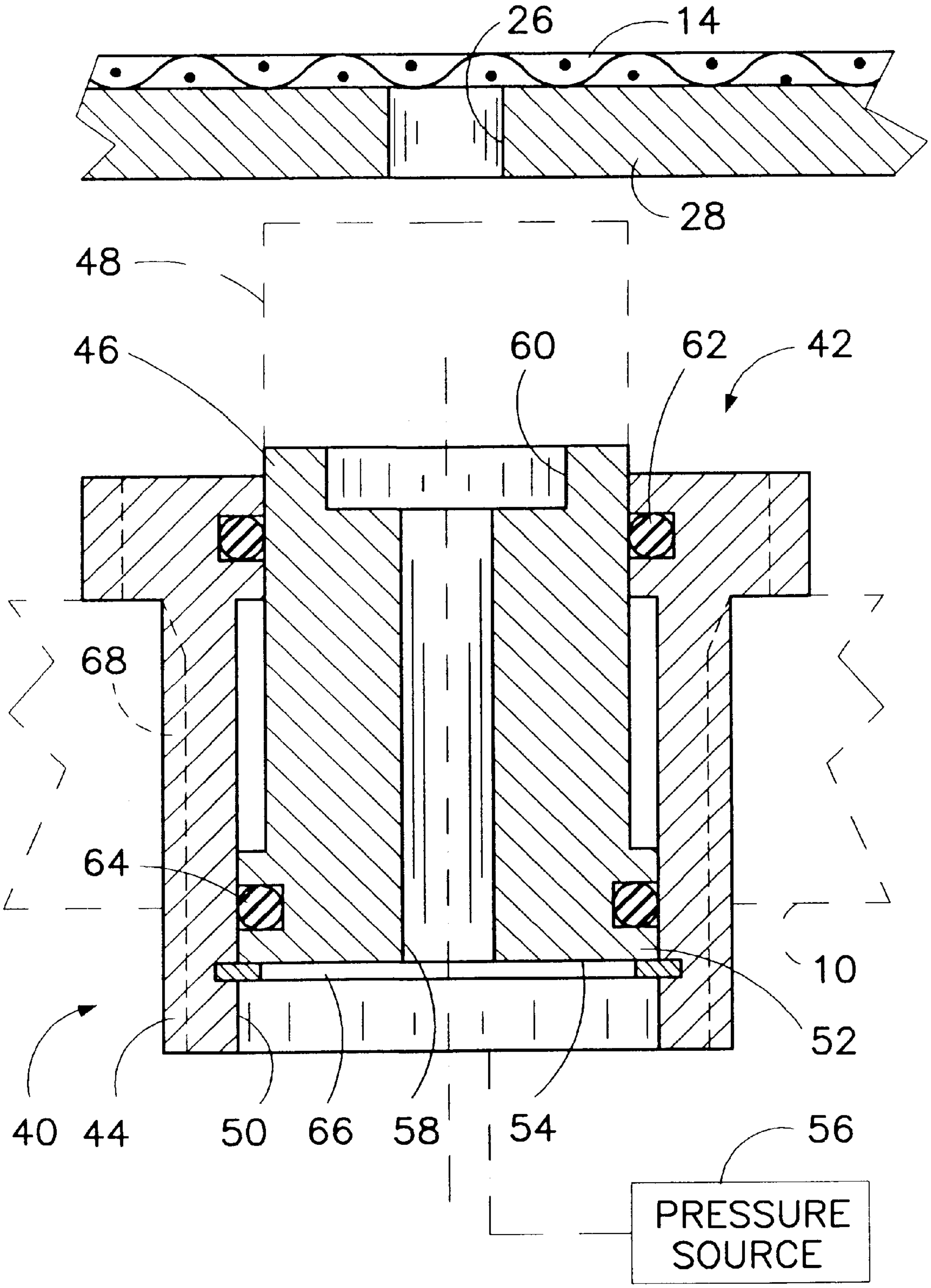
FIG. 5 is a schematic cross-sectional view of an ejector nozzle used to distort a filter web, in accordance with the present invention.

As illustrated in FIG. 5, an ancillary or alternative cake removal mechanism 40 incorporates a nozzle assembly 42 having a base element or holder 44 fixed to case 10. The nozzle assembly also has a generally cylindrical ejector element 46 movably mounted to base element 44 for shifting between a use position (phantom lines) 48 adjacent to filter basket 12 and a neutral position (solid lines) spaced from filter basket 12. Base element 44 is provided with a bore 50, ejector element 46 being slidably disposed in the bore. Base element 44 and ejector element 46 are made of any suitable material, for example, a metal or a polymeric substance such as polytetrafluoroethylene.

Ejector element 46 may be provided with a circumferentially extending flange 52 disposed in bore 50. This flange 52 serves in part to provide a pressure surface 54 for enabling a shifting of ejector element 46 in a radially inward direction upon the application of pressurized fluid from a pressure source 56 to flange 52. The pressurized fluid, e.g., gas, is delivered to nozzle assembly 42 also with the purpose of generating a jet of gas which passes through a bore 58 in ejector element 46 and emanates from nozzle assembly 42 against filter basket 12. The jet of gas (e.g., air) traverses passageways or perforations 26 in filter basket 12 to engage filter media 14 and exert an inward force thereon, thereby billowing the filter media to dislodge heel or cake deposited thereon. If basket 12 is rotating, the distortion in filter media 14 proceeds in a wave-like fashion along a circumference of the basket. Generally, ejector element 46 rides along an outer surface of basket 12 during the heel removal operation.

Bore 58 may include an enlarged recess 60 at a free end of ejector element 46 for increasing the time that air or gas is fed through each successive or adjacent perforation 26 in a transverse plane (not shown or designated) through basket 12.

Nozzle assembly 42 may be provided with a compression or restoring spring (not illustrated) for returning ejector element 46 from the extended use position 48 to the retracted neutral position upon cessation of pressure from source 56. Alternatively, pressure source 56 may be provided with a suction capability for pulling ejector element 46 back into bore 50 upon the completion of a cake removal operation.

Generally, it is contemplated that a series of nozzle assemblies 42 are held in a manifold mounted to case 10. The plural nozzle assemblies are disposed in a linear array parallel to the rotation axis of the centrifuge. Polytetrafluoroethylene O-rings 62 or 64 may be provided for sealing purposes, while a retainer ring 66 limits the motion of ejector element 46 in an outward direction. An external screw thread 68 on base element 44 cooperates with an internal screw thread (not separately designated) on case 10 or the manifold is the one means that maybe utilized to fasten nozzle assembly 42 to the case or the manifold.

Although the invention has been described in terms of particular embodiments and applications, one of ordinary skill in the art, in light of this teaching, can generate additional embodiments and modifications without departing from the spirit of or exceeding the scope of the claimed invention. For example, a cake removal mechanism as disclosed herein may be used as an alternative to a conventional deflector blade or plow, as well as a supplement thereto. In addition, the embodiment of FIG. 5 may be used as an alternative or a supplement to the embodiment of FIGS. 1–4. It is to be noted further that ejector element 30 may take the form of a wheel rotatably mounted to a radially inner end of a radially shiftable plunger.

Accordingly, it is to be understood that the drawings and descriptions herein are offered by way of example to facilitate comprehension of the invention and should not be construed to limit the scope thereof.

What is claimed is:

1. A centrifuge comprising:

a case;

a perforated filter basket disposed in said case for rotation about an axis;

filter media disposed along an inner surface of said filter basket; and a cake removal mechanism at least partially disposed in said case outside of said filter basket and engageable with said filter media to distort said filter media and induce separation of deposited cake from said filter media, said cake removal mechanism including an ejector element movably mounted to said case for shifting between a use position adjacent to said filter basket and a neutral position spaced from said filter basket.

2. The centrifuge defined in claim 1 wherein said filter basket has a plurality of perforations and wherein said cake removal mechanism includes an elongate strap disposed between said filter media and said filter basket along an inner surface of said filter basket so as to overlie at least one of said perforations, said ejector element in said use position cooperating with said strap to distort said filter media and thereby disengage cake from said filter media.

3. The centrifuge defined in claim 2 wherein said strap is provided with at least one pin traversing said one of said perforations, said ejector element engaging said pin in a cleaning operation to push said strap and concomitantly said filter media.

4. The centrifuge defined in claim 3 wherein said ejector element has a camming surface facing said filter basket, said camming surface engaging said pin to push said strap and concomitantly said filter media.

5. The centrifuge defined in claim 2 wherein said strap is a circumferentially extending endless band.

6. The centrifuge defined in claim 5 wherein said band is provided with a plurality of pins traversing respective ones of said perforations, said ejector element engaging said pins successively while said filter basket is rotated.

7. The centrifuge defined in claim 2 wherein said ejector element is shiftable in a radial direction relative to said filter basket.

8. The centrifuge defined in claim 1 wherein said cake removal mechanism includes a nozzle assembly having a base element fixed to said case, said ejector element being movably mounted to said base element for shifting between said use position and said neutral position.

9. The centrifuge defined in claim 8 wherein said base element is provided with a bore, said ejector element being slidably disposed in said bore.

10. The centrifuge defined in claim 9 wherein said ejector element is provided with a flange disposed in said bore.

11. The centrifuge defined in claim 8 wherein said ejector element is provided at a free end with an enlarged recess.

12. The centrifuge defined in claim 8 wherein said ejector element is provided at a free end with an enlarged recess.

13. A centrifuge comprising:

a case;

a perforated filter basket disposed for rotation in said case;

filter media disposed along an inner surface of said filter basket;

an elongate flexible cake removal strap disposed between said filter media and said basket along an inner surface of said filter basket; and an actuator mechanism disposed in said case outside of said filter basket in cooperative relationship with said strap for shifting said strap.

14. The centrifuge defined in claim 13 wherein said actuator mechanism includes an ejector element movably mounted to said case for shifting between a use position adjacent to said filter basket and a neutral position spaced from said filter basket.

15. The centrifuge defined in claim 14 wherein said filter basket has a plurality of perforations, said strap overlying at least one of said perforations, said ejector element in said use position cooperating with said strap to distort said filter media and thereby disengage cake from said filter media.

16. The centrifuge defined in claim 14 wherein said strap is provided with at least one pin traversing said one of said perforations, said ejector element engaging said pin to push said strap and concomitantly said filter media.

17. The centrifuge defined in claim 14 wherein said ejector element is shiftable in a radial direction relative to said filter basket.

18. The centrifuge defined in claim 13 wherein said strap is a circumferentially extending endless band.

19. The centrifuge defined in claim 18 wherein said filter basket has a plurality of perforations, said band being provided with a plurality of pins traversing respective ones of said perforations, said actuator mechanism engaging said pins successively while said filter basket is rotated.

20. A method for cleaning a filtering centrifuge, comprising:

rotating a perforated filter basket in a case, a filter media being disposed along an inner surface of said filter basket;

exerting a radial force against said filter media through perforations in said filter basket during the rotation of said basket in said case; and by virtue of the force exerted on said filter media through said perforations, distorting said filter media to induce separation of deposited cake from said filter media, the exerting of said force including shifting an ejector element in said case inwardly towards said filter basket.

21. The method defined in claim 20, wherein the exerting of said force includes pressing, with said ejector element in a radially inward direction, pins extending though said perforations.

22. The method defined in claim 21 wherein said pins are connected to an elongate flexible strap disposed between said filter basket and said filter media, further comprising distorting said strap, thereby effectuating the distorting of said filter media.

23. The method defined in claim 20 wherein the shifting of said ejector element includes feeding pressurized fluid to said ejector element.

24. The method defined in claim 20 wherein the exerting of said force includes ejecting a fluid medium, in a radially inward direction, though said perforations.

25. The method defined in claim 20 wherein the exerting of said force is performed along only a portion of said filter basket.

26. A centrifuge comprising:

a case;

a perforated filter basket disposed for rotation in said case;

filter media disposed along an inner surface of said filter basket; and a nozzle assembly positioned outside said filter basket and having a base element fixed to said case, said nozzle assembly including an ejector element movably mounted to said base element for shifting between a use position adjacent to said filter basket and a neutral position spaced from said filter basket;

wherein said nozzle assembly generates a jet of gas which passes through perforations in said filter basket to distort said filter media and induce separation of cake deposited thereon.

27. The centrifuge defined in claim 6 wherein said base element is provided with a bore, said ejector element being slidably disposed in said bore.

28. The centrifuge defined in claim 25 wherein said ejector element is provided with a flange disposed in said bore.

* * * * *

UNITED STATES PATENT AND TRADEMARK OFFICE

CERTIFICATE OF CORRECTION

PATENT NO. : 6,063,298
DATED : May 16, 2000
INVENTOR(S) : William J. Wilkie et al.

It is certified that error appears in the above-identified patent and that said Letters Patent is hereby corrected as shown below:

Column 2,
Line 7, change "rejector" to -- ejector --.

Column 3,
Line 12, change "he" to -- the --.

Column 5,
Line 22, change "62 or 64" to -- 62 and/or 64 --;
Line 27, delete "the" (second occurrence) and change "maybe" to -- may be --.

Claim 27,
Line 1, change "claim 6" to -- claim 26 --.

Claim 28,
Line 1, change "claim 25" to -- claim 27 --.

Signed and Sealed this

Fourth Day of September, 2001

*Attest:*

Nicholas P. Godici

NICHOLAS P. GODICI

*Attesting Officer*

*Acting Director of the United States Patent and Trademark Office*